US012806564B2

(12) United States Patent
Venegas

(10) Patent No.: US 12,806,564 B2
(45) Date of Patent: Nov. 24, 2026

(54) WET GAS COOLER AND SCRUBBER

(71) Applicant: Blue Ram Group, LLC, Monahans, TX (US)

(72) Inventor: Fernando Venegas, Odessa, TX (US)

(73) Assignee: Blue Ram Group, LLC, Monahans, TX (US)

(*) Notice: Subject to any disclaimer, the term of this patent is extended or adjusted under 35 U.S.C. 154(b) by 613 days.

(21) Appl. No.: 18/236,900

(22) Filed: Aug. 22, 2023

(65) Prior Publication Data

US 2025/0065261 A1 Feb. 27, 2025

(51) Int. Cl.
*B01D 53/26* (2006.01)
*E21B 43/34* (2006.01)

(52) U.S. Cl.
CPC ............ *B01D 53/265* (2013.01); *E21B 43/34* (2013.01); *B01D 2221/04* (2013.01)

(58) Field of Classification Search
CPC .... B01D 53/265; B01D 2221/04; E21B 43/34
See application file for complete search history.

(56) References Cited

U.S. PATENT DOCUMENTS 2,434,637 A * 1/1948 Brister .................. F22B 37/322 55/318
4,737,168 A * 4/1988 Heath ....................... C07C 7/00 95/260
5,824,136 A 10/1998 Meline
9,597,622 B2 * 3/2017 Grave .................... B01D 1/305
11,639,656 B1 * 5/2023 Welch ................ B01D 19/0042 204/661
2003/0192433 A1 * 10/2003 Steiner ..................... F16J 13/08 55/486
2004/0159238 A1 8/2004 Strmen
(Continued)

FOREIGN PATENT DOCUMENTS

EP 3653281 A1 5/2020

OTHER PUBLICATIONS

Robert Chin, Graham McVinnie, Jimmie Riesenberg, Victor van Asperen, Savvy Separator: Scrubber Debottlenecking https://jpt.spe.org/scrubber-debottlenecking (Year: 2015).*
(Continued)

*Primary Examiner* — Jennifer Dieterle
*Assistant Examiner* — Phillip Y Shao
(74) *Attorney, Agent, or Firm* — Jack V. Musgrove

(57) ABSTRACT

A wet gas scrubbing system uses a differential control valve to provide gas at a preset pressure to a scrubber bottle having a novel design. An inlet is attached to the side of the main body of the bottle near the top, where there is also an outlet on the top cover. A baffle divides the interior of the body into two chambers, and forces the gas stream downward along the first chamber and thence upward along the second chamber. The baffle includes a bottom diverter plate having holes along its periphery, and forms a complete seal between the two chambers except for these holes. Once in the second chamber, the gas exits via a perforated pipe section attached to the outlet. Expansion of the gas within the chambers and perforated outlet results in cooling and condensation, allowing liquids to be separated and removed.

8 Claims, 4 Drawing Sheets

(56) References Cited

U.S. PATENT DOCUMENTS

| | | | | |
|---|---|---|---|---|
| 2005/0011170 | A1* | 1/2005 | Christiansen | B04C 7/00 55/345 |
| 2009/0196806 | A1* | 8/2009 | Larnholm | B04C 5/103 422/269 |
| 2012/0006762 | A1* | 1/2012 | McCabe | B01D 17/0214 210/801 |
| 2013/0047510 | A1* | 2/2013 | Corry | B01J 4/004 48/128 |
| 2013/0247764 | A1* | 9/2013 | Kvamsdal | B04C 3/06 96/208 |
| 2016/0250571 | A1 | 9/2016 | Bloomfield | |
| 2017/0209824 | A1 | 7/2017 | Abbott | |
| 2017/0348635 | A1 | 12/2017 | Edge | |
| 2019/0046899 | A1* | 2/2019 | Cumbee | B01D 21/003 |

OTHER PUBLICATIONS

Office of the Federal Register, "Standards of Performance for New Stationary Sources", 30 C.F.R. 60, standard JJJJ, (Jul. 1, 2022).

Aspire Energy Resources, "What is an Oil Treater and How Does it Work?" [online], retrieved on Aug. 22, 2023 from the Internet URL: https://www.aspireenergy.com/what-is-an-oil-treater-and-how-does-it-work/ (2019).

Cutter USA, "JT Units" [online], retrieved on Aug. 22, 2023 from the Internet URL: https://cutterusa.com/jt-units/ (2019).

Globalspec, "Scrubbers Information" [online], retrieved on Aug. 22, 2023 from the Internet URL: https://www.globalspec.com/learnmore/manufacturing_process_equipment/air_quality/scrubbers (2019).

Integrated Flow Solutions, "What Is a Fuel Gas Scrubber?" [online], retrieved on Aug. 22, 2023 from the Internet URL: https://ifsolutions.com/what-is-a-fuel-gas-scrubber/# (2019).

Kimray, "How Natural Gas Compressors Work: A Video Overview" [online], retrieved on Aug. 22, 2023 from the Internet URL: https://kimray.com/training/how-natural-gas-compressors-work-video-overview#:~:text=A%20natu (2019).

Titan Production Equipment, "Gas Scrubber" [online], retrieved on Aug. 22, 2023 from the Internet URL: https://www.titanpeq.com/production-equipment/gathering-and-central-processing-equipment/gas-scrubber/ (2019).

* cited by examiner

WET GAS COOLER AND SCRUBBER

BACKGROUND OF THE INVENTION

Field of the Invention

The present invention generally relates to separation of substances in a fluid, and more particularly to an apparatus for separating liquids from a gas stream such as removing natural gas liquids or water during gas well extraction.

Description of the Related Art

Fluid processing is an important part of oil and gas well production. For gas wells in particular it is often necessary to remove substances such as contaminants or liquids that might otherwise damage downstream processing equipment. Gas scrubbers are a common solution for this problem.

There are many different types of gas scrubbers including wet scrubbers, dry scrubbers and precipitators. Wet scrubbers typically use a liquid of some sort to filter out contaminants whereas dry scrubbers use dry sorbent materials. Electrostatic precipitators are filterless devices and use an electric field to attract contaminants and trap them.

One class of scrubbers uses what is known as the Joule-Thompson effect to separate liquids from a wet gas stream. According to this principle, when a gas expands from higher pressure to lower pressure it also cools, which can lower the temperature sufficiently to collect atomized liquids as well as condense some of the gaseous components to a liquid state. In particular natural gas liquids can be recovered in various amounts depending on gas composition, pressures, and temperatures involved.

SUMMARY OF THE INVENTION

The present invention in at least one embodiment is generally directed to an apparatus for separating liquids from a gas stream comprising a vertically-disposed elongate hollow main body, a top cover attached to a top end of the main body, a bottom cover attached to a bottom end of the main body, an inlet attached to the main body, an outlet attached to the top cover, a baffle interposed between the inlet and the outlet which diverts the gas stream, and a drain attached to the bottom cover. In the illustrative embodiment, the inlet is attached to a side of the main body along an upper portion thereof proximate the top end, the outlet includes a perforated pipe section extending through the top cover, and the baffle divides an interior of the main body into at a first chamber and a second chamber, so the baffle forces the gas stream from the upper portion of the main body downwardly along the first chamber to a lower portion and thence upwardly along the second chamber to the upper portion. A differential control valve can be connected to the inlet to automatically maintain an exit pressure of the gas stream as it is fed to the inlet. The baffle is preferably constructed of a top diverter plate, an intermediate diverter plate, and a bottom diverter plate generally forming a Z-shape, with the top diverter plate being proximate the top cover, the intermediate diverter plate spanning the upper portion of the main body to the lower portion, and the bottom diverter plate located along the lower portion, with the inlet entering the main body below the top diverter plate A side edge of the top diverter plate is affixed to a top edge of the intermediate diverter plate, a bottom edge of the intermediate diverter plate is affixed to a side edge of the bottom diverter plate, and the bottom diverter plate has a plurality of holes therein, such that the baffle forms a complete seal between the first chamber and the second chamber except for the holes. The holes in the bottom diverter plate are preferably formed along a periphery thereof but not in a central area.

The above as well as additional objectives, features, and advantages in the various embodiments of the present invention will become apparent in the following detailed written description.

BRIEF DESCRIPTION OF THE DRAWINGS

The present invention may be better understood, and its numerous objects, features, and advantages of its various embodiments made apparent to those skilled in the art by referencing the accompanying drawings.

The use of the same reference symbols in different drawings indicates similar or identical items.

DESCRIPTION OF THE PREFERRED EMBODIMENT(S)

There are still many problems with conventional scrubbers for wet gas. One of the biggest is efficiency in terms of liquids removal. Most systems leave a significant amount of suspended liquid or near-liquid in the exit stream, which can create all kinds of issues for downstream equipment, resulting in increased maintenance costs and downtime in the extraction process. Attempts to remedy these inefficiencies merely result in greater expense or require constant chemicals injection.

Another problem relates to the gas compressors used in these systems, which may be necessary in order to raise the pressure of the incoming gas stream and induce the Joule-Thompson effect in the expansion bottle. The compressors can require excessive repairs due to the high pressures, temperatures and load requirements involved to achieve successful liquids elimination, particularly when some of the gas product is rerouted to the compressor as fuel. Detonation, intake manifold air temperature (IMAT) and emissions errors often arise in the compressors. Detonation, sometimes called pre-ignition or knock, is when the fuel gas ignites prematurely due the presence of natural gas liquids and water. It can cause serious damage to the engine components such as melted spark plugs, blown head gaskets, hammered bearings, cracked pistons and cracked piston rings. Detonation is also affected by the IMAT. In the heat of the summer the air, fuel gas can be too hot. IMAT error codes can only be removed if the temperature is lowered. There are a variety of other problems that can arise as well. For example, the gas compression also results in a higher entry temperature of the raw gas stream which can contribute to expansion bottle failures.

It would, therefore, be desirable to devise an improved wet gas scrubber that more efficiently separates liquids from the gas stream. It would be further advantageous if the method could allow for a cooler exit stream to mitigate errors in compressor engines. These and other advantages are achieved in various implementations of the present invention by providing an expansion bottle design that allows for a more complete separation of liquids and an increased pressure differential for the bottle resulting in a cooler exit stream. The bottle design includes a unique layout for the inlet and outlet locations, an enhanced baffle construction using multiple diverter plates, and a perforated outlet pipe. While each of these design components individually offer performance improvement, the combination in particular creates a superior expansion chamber which cools the gas causing nearly all liquids to drop out into the expansion tank, creating a lean and cool fuel gas stream. Natural gas compression engines have to pass a standards requirement (40 C.F.R. 60, Subpart JJJJ), and the cooler, leaner fuel gas produced in accordance with the present invention helps the engine pass that test.

Figure 1:
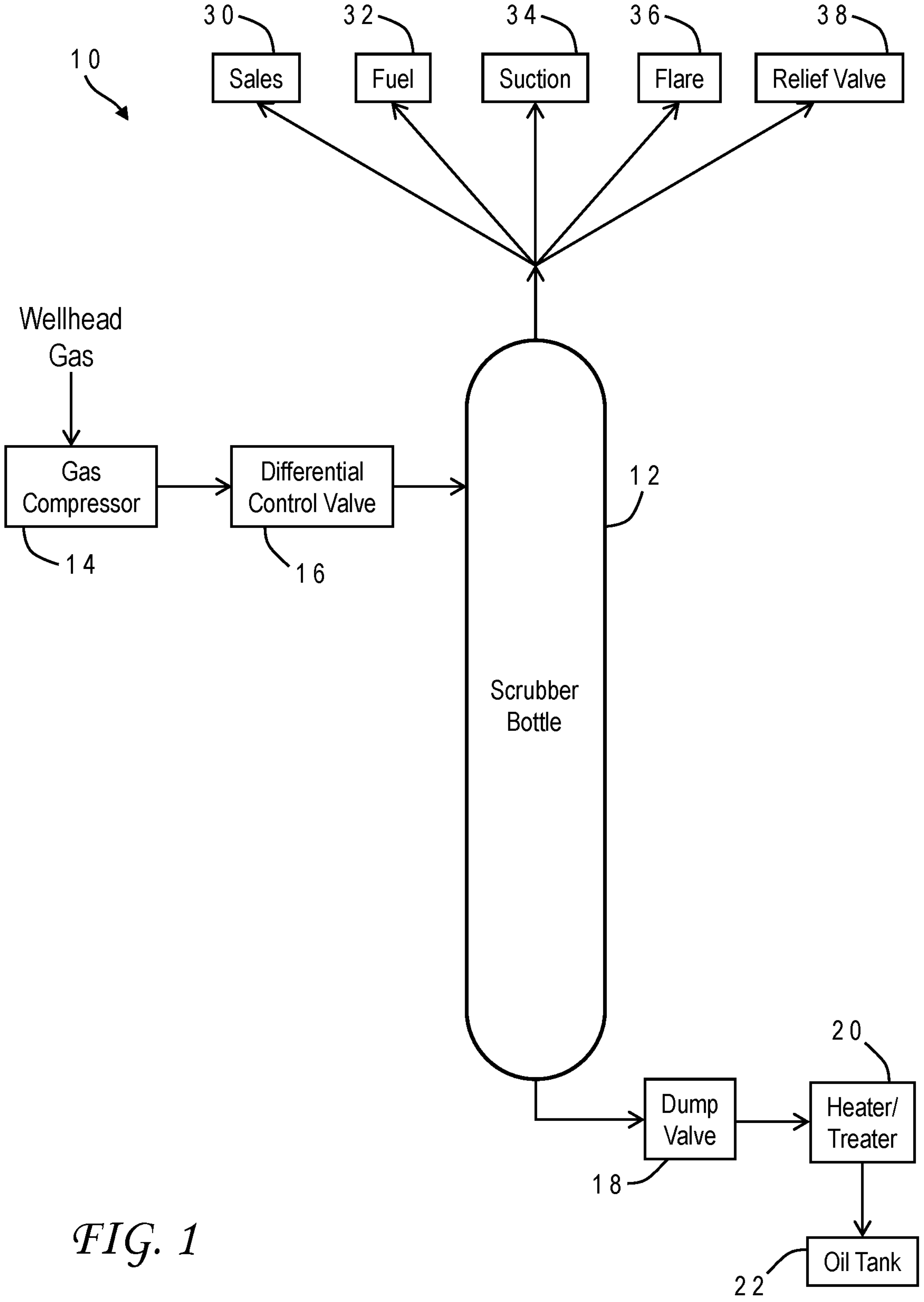
FIG. 1 is a schematic diagram of a gas scrubbing system designed in accordance with one implementation of the present invention.

With reference now to the figures, and in particular with reference to FIG. 1, there is depicted one embodiment 10 of a wet gas scrubbing system constructed in accordance with the present invention. Scrubbing system 10 is generally comprised of a vertical scrubber bottle 12, a gas compressor 14, a differential control valve 16, a dump valve 18, a heater/treater 20, and an oil/liquids tank 22. Gas compressor 14 receives the wellhead gas and ensures that the raw gas stream is raised to a sufficient pressure according to the particular specifications for the system, which may be as high as 1100 psi. The entry line of control valve 16 receives the compressed gas from compressor 14 and automatically adjusts to maintain a preset pressure at the exit line, i.e., on the supply line for scrubber bottle 12 according to the specifications which may include considerations regarding the fuel needs of the compressor and the dump mechanisms. In the illustrative implementation the exit pressure of control valve 16 is in the range of 120-170 psi, preferably about 150 psi. Based on the construction of scrubber bottle 12 and other operational specifications as described further below, this results in a pressure of about 100 psi for the gas stream at the outlet of scrubber bottle 12, which satisfies the fuel gas pressure requirement for the compressor engine. This bottle pressure differential (150 psi inlet versus 100 psi outlet) contributes to the cooling and condensation of the gas and liquids. For the exemplary embodiment the gas stream starts in the range of 130° F.-140° F. and drops 40° F. before exiting the bottle. Additional cooling/condensation results from the control valve pressure differential, i.e., there is an initial stage of cooling and condensing of vapors into fluid at the control valve exit, a second stage where the gas stream enters the bottle and a pressure differential is created in the first chamber, a third stage as it passes through the holes in the diverter plate into the second chamber, and a final stage when the gas enters the perforated outlet creating another pressure differential.

Liquids formed in scrubber bottle 12 during the process are removed with a drain line at the bottom via dump valve 18. While the exact nature of the liquids will depend upon the gas source, for a natural gas well the composition of the liquid is mostly water and natural gas liquids (e.g., ethane, propane, butane, isobutane, pentane) in various ratios. A pneumatic level control sensor (not shown) may be used for automatic control of the dump valve, or field operators can manually dump the liquids. The liquids are sent to heater/treater 22 for processing such as breaking down emulsions and removing water.

The outlet of scrubber bottle 12 can direct the processed gas to a number of different lines, particularly a sales line 30 that leads to collection and/or storage facilities to provide the processed gas as a commodity. The gas may be separated further into different gas constituents for this purpose. A fuel line 32 can siphon off a portion of the gas to power the engine for gas compressor 14 or any other local equipment. In some embodiments, if the bottle is overpressured a valve dumps excess outlet gas into a suction line 34 for gas compressor 14 (i.e., recirculated). In other embodiments excess gas is sent to a flare line 36 or to a pressure relief valve 38 that vents to the atmosphere.

With the exception of scrubber bottle 12, most of the components of scrubbing system 10 can be obtained off-the-shelf. Appropriate parts include the stem-guided high-pressure control valve available from Kimray Inc. of Oklahoma City, Oklahoma, as part number CVS1S4TW08L2S, with the diaphragm-controlled high-pressure controller part number PDHND1S. Those skilled in the art will appreciate, however, that this overall configuration for scrubbing system 10 may change considerably depending on the application, and may include other components as well. Every customer and/or location can be different. For example, the wellhead gas may be treated prior to entering gas compressor 14 as is known in the art. The entire system can further be mounted on an oil field skid (not shown) whose design and function is based on the particular oilfield in which the skid is employed.

Figure 2:
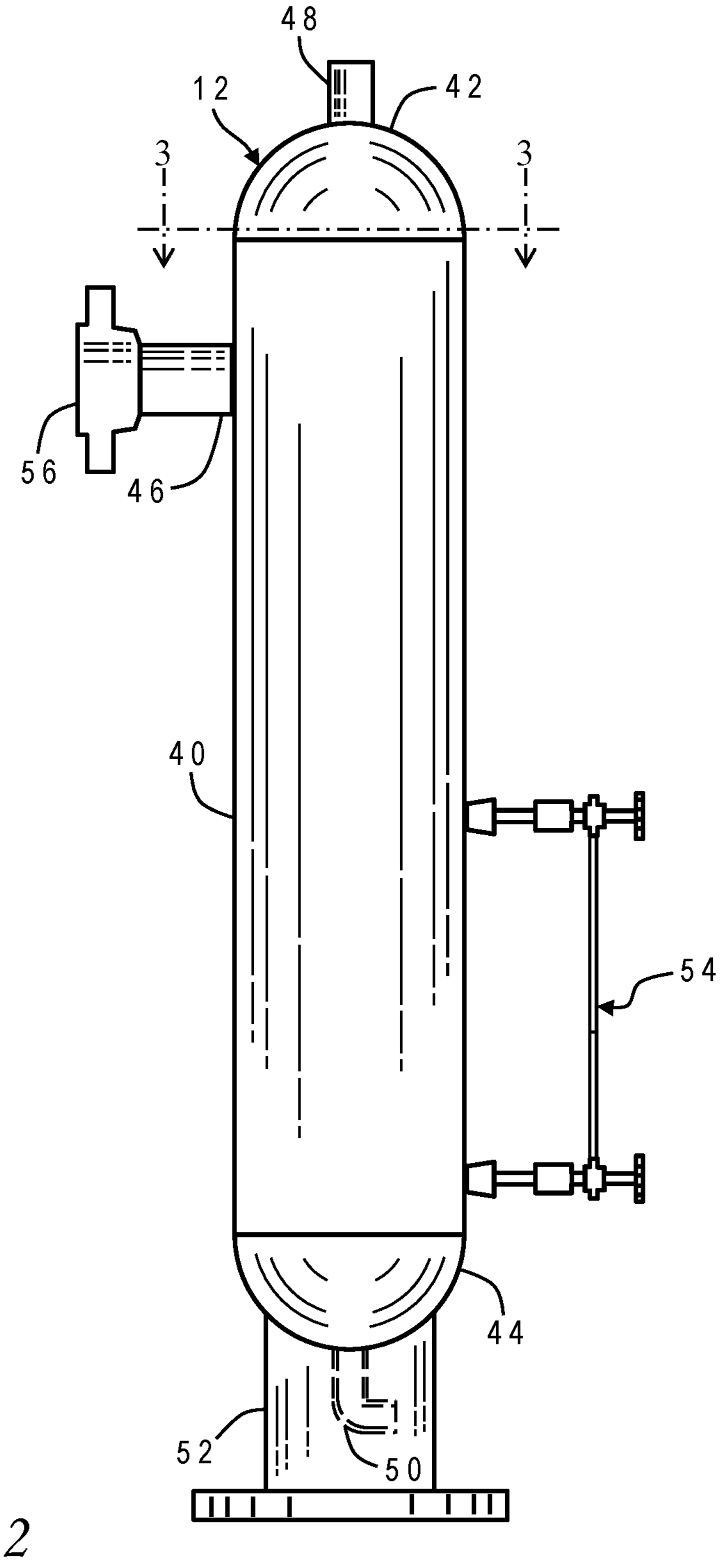
FIG. 2 is a front elevational view of a scrubber bottle that may be used with the gas scrubbing system of FIG. 1 in accordance with one embodiment of the present invention.

Exterior features of scrubber bottle 12 can be seen in the front elevational view of FIG. 2, and include a main body 40, a top hemispherical cover 42, a bottom hemispherical cover 44, an inlet 46, an outlet 48, a drain line 50, a stand 52, and a sight glass assembly 54. Main body 40 is elongate and preferably tubular or generally cylindrical, with an upper portion and a lower portion, the upper portion having a top end attached to top cover 42 and the lower portion having a bottom end attached to bottom cover 44 opposite the top end. Top cover 42 and bottom cover 44 do not need to be perfect hemispheres but they are preferably at least dome-shaped. In this embodiment inlet 46 is located at the left side of main body and enters a hole formed in the upper portion thereof, proximate the top end. Inlet 46 may have a fitting 56 or other fixture for attachment to piping that provides the gas stream from control valve 16. Outlet 48 is located at the very top of top cover 42 and as discussed further below in conjunction with FIGS. 4A-4D has a pipe section that extends downwardly through a hole formed in top cover 42 and further into the upper portion of main body 40. Drain line 50 is located at the very bottom of bottom cover 44 and extends through a hole formed therein. Stand 52 includes a flat (horizontal) base and a pedestal that supports bottom cover 44, and maintains scrubber bottle 12 in a generally vertical orientation. Sight glass assembly 54 is a standard gauge for monitoring liquid levels using a transparent tube in fluid communication with two vertically-spaced openings along the right side of main body 40. Another exterior feature not visible in FIG. 2 but seen in FIG. 3 is a level control port 58 mounted on the backside of main body 40 for the pneumatic level control.

For typical operational parameters of scrubber bottle 12, the piping and valves generally do not need to be heated to prevent freezing but the inlet and drain line can be heat traced and insulated to prevent freezing in colder climates.

Figure 3:
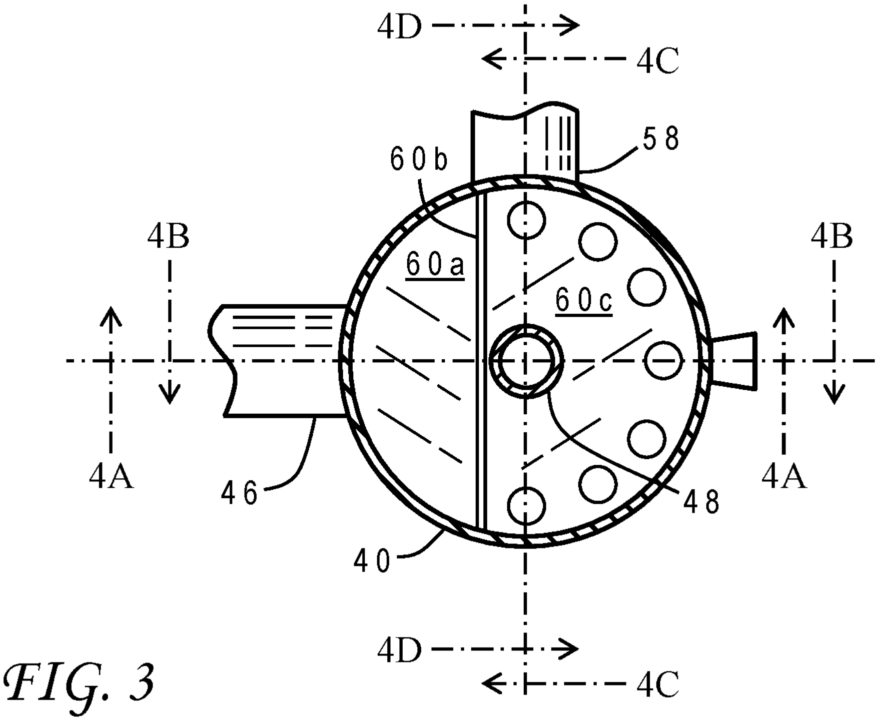
FIG. 3 is a top sectional view of the scrubber bottle taken along line 3-3 of FIG. 2.

Interior features of scrubber bottle 12 can be further seen in FIG. 3 which is a downward-looking sectional view of an interior space of scrubber bottle 12 from the top end of main body 40. These features are also visible in the sectional views of FIGS. 4A through 4D taken along the various section lines in FIG. 3. In this illustrative embodiment, a baffle 60 comprised of three diverter plates 60*a* (top), 60*b* (intermediate), 60*c* (bottom) is interposed between inlet 46 and outlet 48, and generally divides the expansion space within scrubber bottle 12 into two chambers. Inlet 46 enters main body 40 just below top diverter plate 60*a*, so the gas is allowed to initially expand in the first (left/lower) chamber and then passes through a series of holes formed in bottom diverter plate 60*c* to expand further in the second (right/upper) chamber. Any liquids formed in the right/upper chamber can still drain into the bottom of the bottle through the holes in bottom diverter plate 60*c*. Notably, both inlet and outlet are located near/at the top of the vertical scrubber bottle.

Diverter plates 60*a*, 60*b* and 60*c* are all generally flat, and plates 60*a* and 60*c* are disposed horizontally while plate 60*b* is disposed vertically, with the top edge of intermediate diverter plate 60*b* being affixed to the right side edge of top diverter plate 60*a*, and the bottom edge of intermediate diverter plate 60*b* being affixed to the left side edge of bottom diverter plate 60*c*. In this manner, the baffle created by these three diverter plates forms a complete seal between the two interior chambers except for the holes in bottom diverter plate 60*c*, i.e., all of the gas coming into scrubber bottle 12 via inlet 46 must pass through the holes in bottom diverter plate 60*c* before exiting the bottle via outlet 48. In the preferred embodiment top diverter plate 60*a* is located at the seam between main body 40 and top cover 42 (i.e., the upper half), and bottom diverter plate 60*c* is located roughly two-thirds down the length of main body 40 (i.e., the lower half).

As mentioned above, outlet 48 has a pipe section 62 that extends downwardly through top cover 42 and into the upper portion of main body 40. The perforations in pipe section 62 enhance the bottle inlet/outlet pressure differential by allowing further expansion of the gas right after it passes through the perforations. Pipe section 62 is perforated but the terminal end is capped to force all of the gas through the perforations.

Figure 5:
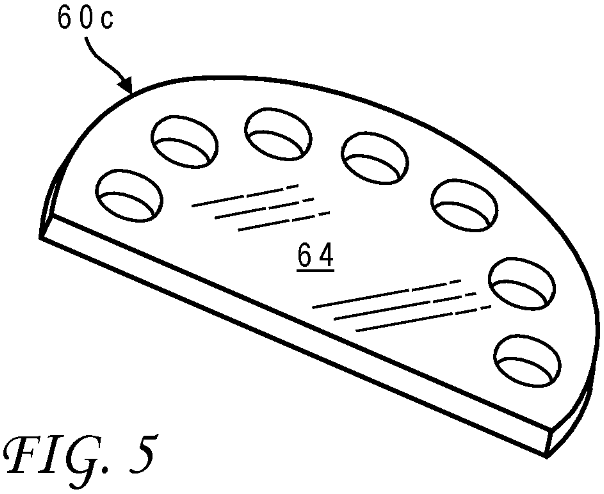
FIG. 5 is a perspective view of a diverter plate having peripheral holes that may be used with the scrubber bottle of FIG. 2 in accordance with one embodiment of the present invention.
Figure 4D:
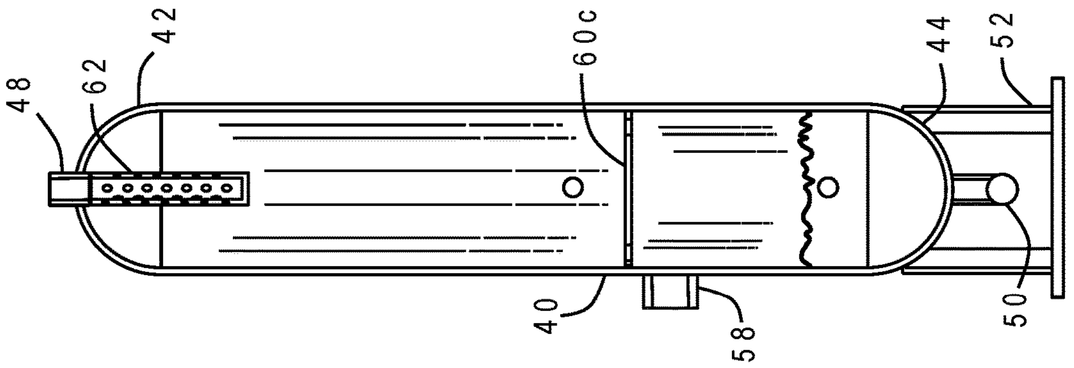
FIG. 4D is a left side sectional view of the scrubber bottle view taken along line 4D-4D of FIG. 3.
Figure 4C:
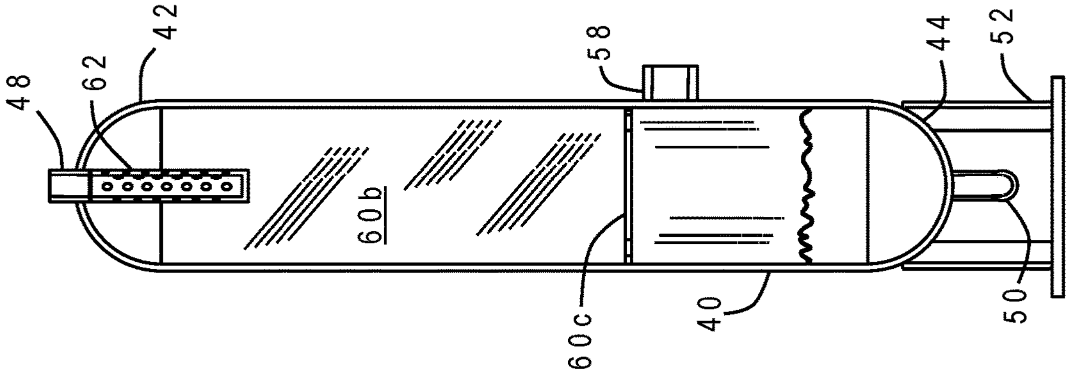
FIG. 4C is a right side sectional view of the scrubber bottle view taken along line 4C-4C of FIG. 3.
Figure 4B:
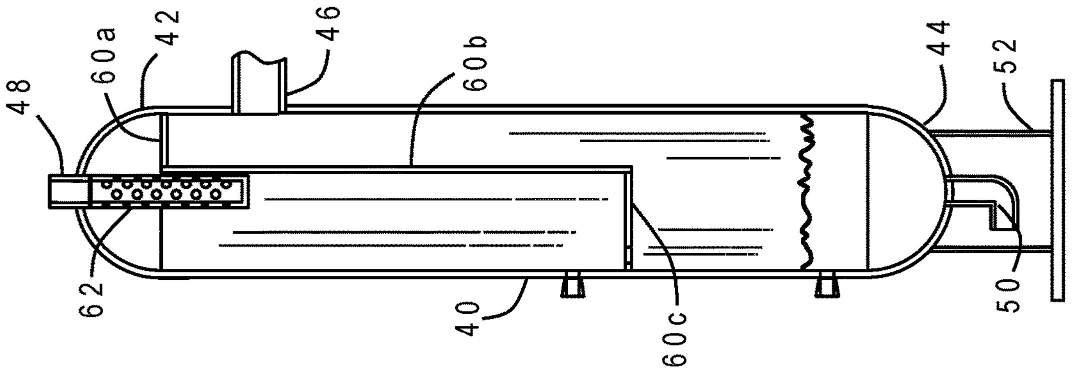
FIG. 4B is a rear sectional view of the scrubber bottle taken along line 4B-4B of FIG. 3.
Figure 4A:
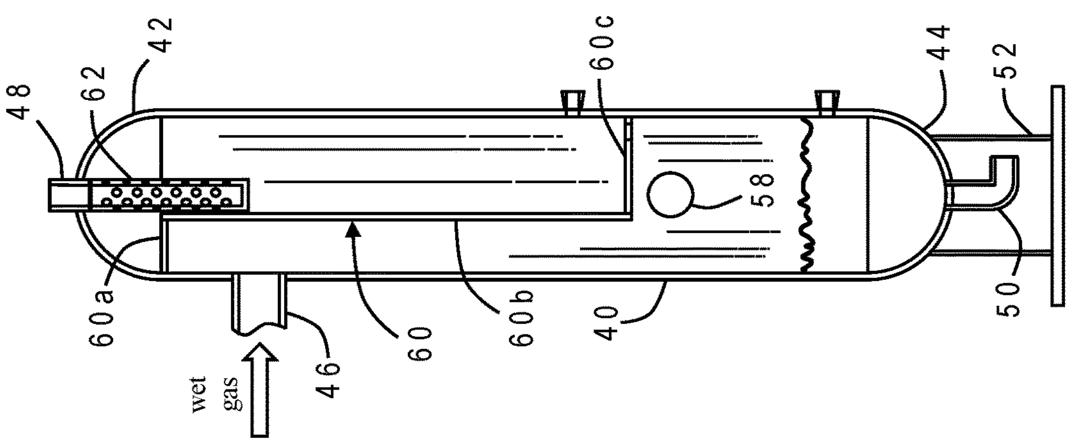
FIG. 4A is a front sectional view of the scrubber bottle taken along line 4A-4A of FIG. 3.

One possible construction of bottom diverter plate 60*c* is seen in FIG. 5. As with top diverter plate 60*a*, the shape of bottom diverter plate 60*c* is generally a circular segment (or disk segment) to accommodate the interior shape of main body 40, with the bottom diverter plate being a larger segment, i.e., top diverter plate 60*a* is a minor segment and bottom diverter plate 60*c* is a major segment. In this manner the transverse location of intermediate diverter plate 60*b* is slightly to one side of pipe section 62 while still allowing outlet 48 to be centered longitudinally within top cover 42. The locations of the holes in bottom diverter plate 60*c* may vary according to design but they are preferably located along the circular periphery of the segment leaving an intact central area 64. This bare spot gives the wet gas a condensation point to help remove mist.

The exact materials and dimensions of the components of scrubber bottle 12 are generally a function of desired performance factors such as pressure rating or liquid volume, as well as cost, so can vary widely according to specifications and application. The components can be constructed of any durable material such as a metal or metal alloy, particularly carbon steel, and can be attached via a combination of welding and screw pipe. Approximate dimensions for an exemplary embodiment are as follows. Cylindrical main body 40 is 48" long with a 8.65" outer diameter. Top cover 42 and bottom cover 44 also have a 8.65" outer diameter. The length of intermediate diverter plate 60*b* is 24". The width of intermediate diverter plate 60*b* is 6.875" long (this is also the length of the chord defining the minor/major segment boundary for top diverter plate 60*a* and bottom diverter plate 60*c*). These components can all have the same thickness of ⅜", resulting in a segment radius of 3.775" for the top and bottom diverter plates 60*a*, 60*c*. The holes in bottom diverter plate 60*c* are preferably 0.875" in diameter, and have a combined surface area that is about 13% of the total area defined by the plate segment. Inlet 46 is 2" diameter and enters main body 40 4" underneath top diverter plate 60*a*. Outlet 48 and pipe section 62 have a diameter of 2". The wall of pipe section 62 is 0.237" thick, and the perforations in pipe section 62 are circular, having a diameter of 0.1875" and occupying about 3% of the outer surface area of pipe section 62 (excluding the capped bottom).

Many of the foregoing features offer individual performance improvements over conventional wet gas scrubbers. These include the overall configuration for the inlet and outlet in a vertical scrubber, the baffle design to optimize gas expansion, and the perforated outlet to further enhance the expansion. These features together provide superior performance as experienced in the field. Systems constructed in accordance with the present invention have a cooler exit gas resulting in cooler valves, cooler (and leaner) fuel for the gas compressor, and cooler off suction, all of which contribute to better runtime. This also eliminates hotter temperature on the driver cylinders and eliminates detonation with little to no cylinder failures. It is also easier to adjust the temperature of the fuel via recirculation and bypass, and provides a cleaner exhaust by-product. Testing has shown that a system such as that described herein lowers engine load 15% on average, and up to 20%.

Although the invention has been described with reference to specific embodiments, this description is not meant to be construed in a limiting sense. Various modifications of the disclosed embodiments, as well as alternative embodiments of the invention, will become apparent to persons skilled in the art upon reference to the description of the invention. For example, the main body of the bottle does not need to cylindrical (i.e., it may have other cross-sectional shapes besides circular), the outlet and attached pipe section could be off center or inclined rather than perfectly vertical, or the drain line could be at a side of the bottom cover rather than at the very bottom. Also, the diverter plates do not have to be perfectly orthogonal or flat (or exactly vertical/horizontal), they could be curved or have any general Z-shape that forces the gas to move downwardly from the upper half of main body 40 (along the left side) to the lower half thereof before returning back upwardly to the upper half (along the right side). Rather than being composed of several plates, the baffle could be integrally formed in one piece such as by casting. The bottom diverter plate 60*c* could also be completely absent in some embodiments in which case the baffle would still force the gas stream downward before it returns upward. Also, embodiments still offers significant performance improvement without using a perforated pipe. It is therefore contemplated that such modifications can be made without departing from the spirit or scope of the present invention as defined in the appended claims.

What is claimed is:

1. An apparatus for separating liquids from a gas stream comprising:

an elongate hollow main body having an upper portion including a top end and having a lower portion including a bottom end located opposite said top end;

a top cover attached to said top end of said main body;

a bottom cover attached to said bottom end of said main body;

an inlet attached to said main body;

an outlet attached to said top cover, said outlet including a pipe section extending through said top cover;

a drain attached to said bottom cover; and a baffle interposed between said inlet and said outlet which divides an interior of said main body into at least a first chamber in fluid communication with said inlet and a second chamber in fluid communication with said outlet, said baffle extending transversely fully across the interior of said main body, and said baffle forcing the gas stream from said upper portion of said main body downwardly within said first chamber along a length of said main body on a first lateral side of the interior of said main body to said lower portion and thence upwardly within said second chamber to said upper portion along another length of said main body on a second lateral side of the interior of said main body wherein the second lateral side is opposite the first lateral side.

2. The apparatus of claim 1 wherein said inlet is attached to a side of said main body along said upper portion thereof proximate said top end.

3. The apparatus of claim 1 wherein said pipe section is perforated.

4. The apparatus of claim 1 wherein:

said baffle is constructed of a top diverter plate, an intermediate diverter plate, and a bottom diverter plate each of said top diverter plate, said intermediate diverter plate, and said bottom diverter plate being generally flat and together generally forming a Z-shape;

said top diverter plate is located proximate said top cover and is generally horizontally disposed;

said intermediate diverter plate spans from said upper portion of said main body to said lower portion of said main body and is generally vertically disposed in a plane generally perpendicular to the inlet;

said bottom diverter plate is located along said lower portion of said main body and is generally horizontally disposed;

said inlet enters said main body below said top diverter plate; and a side edge of said top diverter plate is affixed to a top edge of said intermediate diverter plate, a bottom edge of said intermediate diverter plate is affixed to a side edge of said bottom diverter plate, and said bottom diverter plate has a plurality of holes therein, such that said baffle forms a complete seal between said first chamber and said second chamber except for said holes and the gas stream is forced upwardly through said holes from said first chamber to said second chamber.

5. The apparatus of claim 4 wherein:

said top diverter plate is located at a seam between said top end of said main body and said top cover; and said bottom diverter plate is located approximately two-thirds down a length of said main body.

6. The apparatus of claim 4 wherein:

said main body is generally cylindrical;

said top diverter plate is a minor disk segment; and said bottom diverter plate is a major disk segment.

7. The apparatus of claim 6 wherein:

said bottom diverter plate has a periphery and a central area; and said holes are formed along said periphery but not in said central area.

8. An apparatus for separating liquids from a gas stream comprising:

an elongate hollow main body having an upper portion including a top end and having a lower portion including a bottom end located opposite said top end;

a top cover attached to said top end of said main body;

a bottom cover attached to said bottom end of said main body;

an inlet attached to said main body;

an outlet attached to said top cover, said outlet including a pipe section extending through said top cover;

a drain attached to said bottom cover; and a baffle interposed between said inlet and said outlet which divides an interior of said main body into at least a first chamber on a left side of the interior of said main body in fluid communication with said inlet and a second chamber on a right side of the interior of said main body in fluid communication with said outlet, said baffle having a top diverter plate, an intermediate diverter plate, and a bottom diverter plate, each of said top diverter plate, said intermediate diverter plate, and said bottom diverter plate being generally flat and together generally forming a Z-shape, wherein:

said top diverter plate is generally horizontally disposed, said intermediate diverter plate spans from said upper portion of said main body to said lower portion of said main body and is generally vertically disposed, said bottom diverter plate is generally horizontally disposed, and said baffle forces the gas stream downwardly within said first chamber along a length of said main body on the left side and thence upwardly within said second chamber along another length of said main body on the right side.

* * * * *